June 10, 1930.                H. G. OXX                1,762,793
                          CLIP FOR TUBULAR SHELLS
                            Filed Oct. 16, 1929

Inventor
Henry G. Oxx
By Thomas A. Jenkins Jr.
Attorney

Patented June 10, 1930

1,762,793

UNITED STATES PATENT OFFICE

HENRY G. OXX, OF PROVIDENCE, RHODE ISLAND, ASSIGNOR TO A. T. WALL CO., OF PROVIDENCE, RHODE ISLAND, A CORPORATION OF RHODE ISLAND

CLIP FOR TUBULAR SHELLS

Application filed October 16, 1929. Serial No. 400,113.

My invention relates to clips for tubular shells such as fountain pen clips, the shells of mechanical pencils, etc.

An object of my invention is to attach a clip to a tubular shell preferably through a slot or slots in a side wall thereof, in a manner to conceal said slots and the points of attachment of said clip to said shell. I provide a lug or prong projecting from said clip member through said slot and offset from the edge of said member to thus conceal the slot and point of attachment of the clip. I preferably provide two of said lugs, each projecting integrally from a side wall of the upper end of the clip and inset from the outer edge of said side wall to form shoulders adjacent to said outer edge to conceal said slot or slots.

A further object of my invention is to provide a clip having said lug or lugs offset from the edge of said clip to form such a concealing shoulder.

These and such other objects of my invention as may hereinafter appear will be best understood from the description of the accompanying drawings which illustrate an embodiment of my invention of a type adapted to be attached to a fountain pen cap.

In the drawings, Fig. 1 is a perspective view of a fountain pen cap with my improved clip attached.

Figure 1:
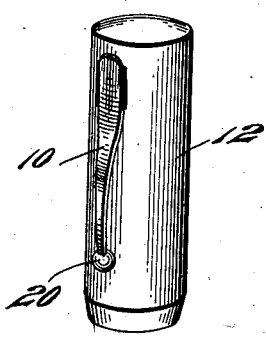

In the drawings, wherein like characters of reference indicate like parts throughout, 10 generally indicates a clip constructed in accordance with the teachings of my invention. Said clip 10 is adapted to be attached to any suitable type of a tubular shell 12, such as the shell of a mechanical pencil, etc. and in the drawings is shown as attached to a fountain pen cap.

Figure 3:
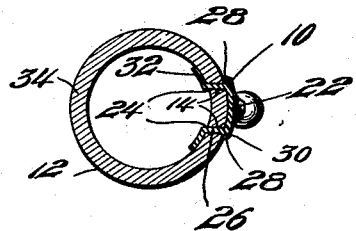
Fig. 3 is a cross sectional view taken along the line 3—3 of Fig. 2.
Figure 2:
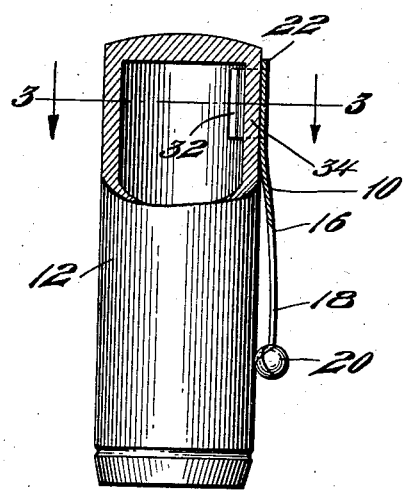
Fig. 2 is an enlarged side elevation thereof with the upper portion thereof shown in section.
Figure 4:
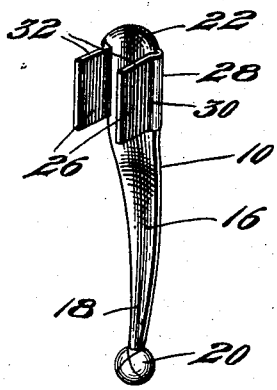
Fig. 4 is a perspective view of my improved clip.

Said tubular shell is provided with a slot 14 for attachment of the clip 10 thereto, preferably as shown two spaced vertical parallel slots 14 in the wall thereof. The clip 10 is preferably curved as at 16 in a manner to more easily engage the pocket and is preferably provided with a pocket engaging finger 18, preferably having a clamping ball 20 at the lower end thereof and projecting downwards from the upper end 22 thereof. The upper end 22 of said clip 10 is preferably of substantially the curvature of said shell 12 and is of a greater width than the spacing 24 between said slots. The upper end 22 of said clip 10 has a lug inset from an edge thereof projecting integrally inwards, preferably a lug 26 projecting integrally inwardly from each edge 28 of said clip of substantially the size of said slots 14. Said lugs 28 are preferably parallel to each other and are bent first towards each other to the amount of the spacing 24 between said slots forming the shoulders 30 adapted to bear against said upper end 22 and then are bent as shown in Fig. 4 preferably straight inwardly as at 32. As shown in Fig. 3 said lugs 26 are adapted to be inserted through the slots 14 and secured within the interior of said shell by bending or in any other suitable manner. As shown in the drawings, I have bent the inner ends 32 of said lugs 26 outwards against the inner side of the wall 34 of said shell to firmly secure the clip thereto. It is apparent that when the inner ends 32 of said lugs 26 are bent against the inner edge of said tubular wall 34 that the shoulders 30 will rest against the outer surface of the wall and will completely conceal the slots 14 and the points and means of attachment of said clip 10 to said shell 12.

It is understood that my invention is not limited to the specific embodiment shown and that various deviations may be made therefrom without departing from the spirit and scope of the appended claims.

What I claim is:

1. In combination, a tubular shell having spaced slots in the wall thereof, and a clip member having a pocket engaging finger at the lower end thereof, an upper end of a greater width than the spacing between said slots having a lug projecting within said shell from each side wall bent first towards the other lug to the amount of the spacing between said slots forming shoulders exterior of said shell to conceal said slots, then inwardly through said slots and then against the inner wall of said shell to secure said clip thereto.

2. In combination, a tubular shell having spaced vertical slots in the wall thereof, and a curved clip member having a clamping ball at the lower end thereof and an upper end of substantially the curvature of said shell and of a greater width than the spacing between said slots having a lug substantially the size of each slot projecting within said shell from each side wall bent first towards the other lug to the amount of the spacing between said slots forming shoulders exterior of said shell to conceal said slots then inwardly through said slots and then against the inner wall of said shell to secure said clip thereto.

3. In combination, a tubular shell having spaced vertical slots in the wall thereof, and a curved clip member having a pocket engaging finger at the lower end thereof, an upper end of a greater width than the spacing between said slots having a lug substantially the size of each slot projecting within said shell from each side wall bent first towards the other lug to the amount of the spacing between said slots forming shoulders exterior of said shell to conceal said slots then inwardly through said slots and then against the inner wall of said shell to secure said clip thereto.

4. In combination, a tubular shell having spaced vertical slots in the wall thereof, and a clip member having a pocket engaging finger at the lower end thereof and an upper end of substantially the curvature of said shell and of a greater width than the spacing between said slots having a lug substantially the size of each slot projecting within said shell from each side wall bent first towards the other lug to the amount of the spacing between said slots forming shoulders exterior of said shell to conceal said slots then inwardly through said slots and then against the inner wall of said shell to secure said clip thereto.

5. A clip member having a transversely curved upper end having a lug projecting inwardly from each side wall thereof bent first towards the other lug against said upper end to form a concealing shoulder and then straight inwardly parallel to the other lug and a curved pocket engaging finger projecting downwards from said upper end having a ball at the lower end thereof.

6. A clip member having an upper end having a lug projecting inwardly from each side wall thereof bent first towards the other lug against said upper end to form a concealing shoulder and then inwardly and a pocket engaging finger projecting downwards from said upper end.

7. A clip member having an upper end having a lug projecting inwardly from each side wall thereof bent first towards the other lug against said upper end to form a concealing shoulder and then straight inwardly parallel to the other and a curved pocket engaging finger projecting downwards from said upper end.

In testimony whereof I affix my signature.

HENRY G. OXX.